United States Patent
Chen

(10) Patent No.: US 10,490,221 B1
(45) Date of Patent: Nov. 26, 2019

(54) NEAR-FIELD TRANSDUCER OF HEAT-ASSISTED RECORDING HEAD HAVING BOTTOM AND MIDDLE DISKS WITH DIFFERENT RECESSIONS FROM MEDIA-FACING SURFACE

(71) Applicant: Seagate Technology LLC, Cupertino, CA (US)

(72) Inventor: Weibin Chen, Edina, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 16/213,232

(22) Filed: Dec. 7, 2018

(51) Int. Cl.
  *G11B 13/08* (2006.01)
  *G11B 5/00* (2006.01)

(52) U.S. Cl.
  CPC ...... *G11B 13/08* (2013.01); *G11B 2005/0021* (2013.01)

(58) Field of Classification Search
  CPC ..... G11B 5/314; G11B 5/6088; G11B 5/4866; G11B 7/1387; G11B 13/08; G11B 2005/0021
  See application file for complete search history.

(56) References Cited

U.S. PATENT DOCUMENTS

| 7,412,143 | B2 | 8/2008 | Rottmayer et al. |
| 7,599,277 | B1 | 10/2009 | Kato et al. |
| 7,957,099 | B2 * | 6/2011 | Tanaka .............. G11B 5/02 360/125.74 |
| 8,248,891 | B2 | 2/2012 | Peng et al. |
| 8,339,740 | B2 | 12/2012 | Zou et al. |
| 8,576,673 | B2 | 11/2013 | Ostrowski et al. |
| 8,958,271 | B1 | 2/2015 | Peng et al. |
| 9,449,625 | B1 | 9/2016 | Vossough et al. |
| 9,728,209 | B2 | 8/2017 | Chen et al. |
| 9,786,311 | B2 | 10/2017 | Chen |
| 9,799,352 | B1 | 10/2017 | Chen et al. |
| 9,852,752 | B1 * | 12/2017 | Chou ............... G11B 5/3163 |
| 9,911,441 | B1 | 3/2018 | Jandric |
| 10,026,421 | B1 * | 7/2018 | Barbosa Neira ..... G11B 5/1871 |
| 10,106,885 | B2 * | 10/2018 | Tanner ............... G11B 5/3116 |
| 10,115,423 | B1 | 10/2018 | Gubbins et al. |
| 10,121,496 | B1 * | 11/2018 | Peng ................. G11B 5/6088 |
| 2003/0112542 | A1 | 6/2003 | Rettner et al. |
| 2011/0096639 | A1 | 4/2011 | Matsumoto et al. |

(Continued)

*Primary Examiner* — Brian E Miller
(74) *Attorney, Agent, or Firm* — Mueting, Raasch & Gebhardt, P.A.

(57) ABSTRACT

A near field transducer has a bottom disc with a first surface facing a write pole of a recording head. The bottom disc is recessed from a media-facing surface of the recording head by a distance R. An anchor layer is stacked on the first surface of the bottom disc and has an enlarged part with a peripheral shape corresponding to that of the bottom disc. The anchor layer further has a peg that extends from an end of the enlarged part towards the media facing surface, the end of the enlarged part recessed from the media facing surface by the distance R. A middle disc is on a second surface of the anchor layer. The middle disc is recessed from the media-facing surface a distance MDSCR that is greater than the distance R. A heat sink is stacked on a third surface of the middle disc. The heat sink is recessed from the media-facing surface by at least a distance TPH that is greater than the distance MDSCR.

20 Claims, 6 Drawing Sheets

(56) References Cited

U.S. PATENT DOCUMENTS

| | | |
|---|---|---|
| 2011/0122737 A1 | 5/2011 | Shimazawa et al. |
| 2011/0149429 A1 | 6/2011 | Araki et al. |
| 2011/0216635 A1 | 9/2011 | Matsumoto |
| 2012/0039155 A1 | 2/2012 | Peng et al. |
| 2012/0072931 A1 | 3/2012 | Imada et al. |
| 2013/0064051 A1 | 3/2013 | Peng et al. |
| 2013/0100783 A1 | 4/2013 | Ostrowski et al. |
| 2013/0170332 A1 | 7/2013 | Gao |
| 2013/0258825 A1 | 10/2013 | Seigler et al. |
| 2013/0279035 A1 | 10/2013 | Peng et al. |
| 2014/0254336 A1 | 9/2014 | Jandric et al. |
| 2014/0376348 A1 | 12/2014 | Cheng |
| 2014/0376349 A1* | 12/2014 | Cheng ................. G11B 5/6088 369/13.33 |
| 2015/0043315 A1* | 2/2015 | Chen ..................... G11B 5/314 369/13.33 |
| 2015/0170675 A1 | 6/2015 | Shimazawa et al. |
| 2015/0179197 A1 | 6/2015 | Clinton et al. |
| 2015/0325261 A1 | 11/2015 | Yang et al. |
| 2015/0340051 A1 | 11/2015 | Tatah et al. |
| 2016/0133286 A1 | 5/2016 | Lee et al. |
| 2016/0351209 A1* | 12/2016 | Chen ..................... G11B 5/314 |
| 2016/0351210 A1* | 12/2016 | Blaber ................. G11B 5/3133 |
| 2017/0032811 A1* | 2/2017 | Chen ..................... G11B 5/6082 |
| 2017/0249958 A1* | 8/2017 | Blaber ................. G11B 5/1871 |
| 2017/0249962 A1 | 8/2017 | Peng |
| 2018/0096702 A1 | 4/2018 | Staffaroni et al. |

\* cited by examiner

NEAR-FIELD TRANSDUCER OF HEAT-ASSISTED RECORDING HEAD HAVING BOTTOM AND MIDDLE DISKS WITH DIFFERENT RECESSIONS FROM MEDIA-FACING SURFACE

SUMMARY

The present disclosure is directed to a near-field transducer of heat-assisted recording head having bottom and middle disks with different recessions from media-facing surface. In one embodiment, a near field transducer has a bottom disc formed of a first material and has a first surface facing a write pole of a recording head. The bottom disc is recessed from a media-facing surface of the recording head by a distance R. An anchor layer is stacked on the first surface of the bottom disc and has an enlarged part with a peripheral shape corresponding to that of the bottom disc. The anchor layer further has a peg that extends from an end of the enlarged part towards the media facing surface. The anchor layer is formed of a second material that is more mechanically robust and less optically efficient than the first material. The anchor layer has a second surface that faces the write pole, the end of the enlarged part recessed from the media facing surface by the distance R. A middle disc is on the second surface of the anchor layer. The middle disc is recessed from the media-facing surface a distance MDSCR that is greater than the distance R. The middle disc has a third surface that faces the write pole. A heat sink is stacked on the third surface of the middle disc. The heat sink is recessed from the media-facing surface by at least a distance TPH that is greater than the distance MDSCR. The heat sink is thermally coupled to the write pole.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

FIG. 6 is a cutaway perspective view of a near-field transducer according to an example embodiment;

DETAILED DESCRIPTION

The present disclosure is generally related to heat-assisted magnetic recording (HAMR), also referred to as energy-assisted magnetic recording (EAMR), thermally-assisted recording (TAR), thermally-assisted magnetic recording (TAMR), etc. In a HAMR device, a source of optical energy (e.g., a laser diode) is integrated with a recording head and couples optical energy to a waveguide or other light transmission path. The waveguide delivers the optical energy to a near-field transducer (NFT). The NFT concentrates the optical energy into a tiny optical spot in a recording layer, which raises the media temperature locally, reducing the writing magnetic field required for high-density recording.

Generally, the NFT is formed by depositing thin-film of a plasmonic material such as gold, silver, copper, etc., at or near an integrated optics waveguide or some other delivery system. When exposed to laser light that is delivered via the waveguide, the light generates a surface plasmon field on the NFT. The NFT is shaped such that the surface plasmons are directed out of a surface of the write head onto a magnetic recording medium.

A magnetic write pole tip is located near the NFT and generates the magnetic field used in recording the data to the recording medium. A coil encompasses a write pole structure away from the NFT, and applying a current to the coil induces the magnetic field at the tip. When the recording medium is heated by the optical energy, the coercivity in the hotspot is lowered such that the magnetic field can change the magnetic orientation within the hotspot, not affecting the recording medium outside the hotspot. Because the hotspot is much smaller than the area affected by the magnetic field, HAMR allows recording much smaller bits than would be possible using the write pole alone.

The use of an optical NFT and magnetic pole in close proximity can make it difficult to optimize performance of one or both devices. For example, the size, shape and materials of the write pole can affect efficient plasmonic resonance of the NFT. Similarly, the need to have an NFT and other devices near the media-facing surface can limit the size and shape of the write pole tip, which can affect the strength and orientation of the magnetic field generated at the tip. In this disclosure, various features of an NFT and write pole are described that can aid in optimizing performance of both the write pole and NFT.

Figure 1:
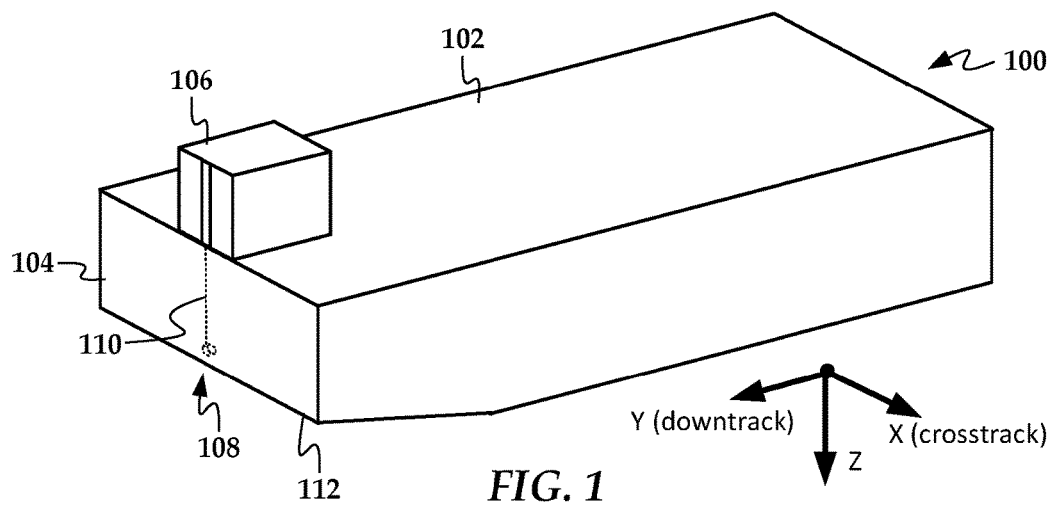
FIG. 1 is a perspective view of a slider assembly according to an example embodiment.

In reference now to FIG. 1, a perspective view shows a read/write head 100 according to an example embodiment. The read/write head 100 may be used in a magnetic data storage device, e.g., HAMR hard disk drive. The read/write head 100 may also be referred to herein interchangeably as a slider, head, write head, read head, recording head, etc. The read/write head 100 has a slider body 102 with read/write transducers 108 at a trailing edge 104 that are held proximate to a surface of a magnetic recording medium (not shown), e.g., a magnetic disk.

The illustrated read/write head 100 is configured as a HAMR device, and so includes additional components that form a hot spot on the recording medium near the read/write transducers 108. These HAMR components include an energy source 106 (e.g., laser diode) and a waveguide 110. The waveguide 110 delivers electromagnetic energy from the energy source 106 to a near-field transducer (NFT) that is part of the read/write transducers 108. The NFT achieves surface plasmon resonance and directs the energy out of a media-facing surface 112 to create a small hot spot in the recording medium.

Figure 2:
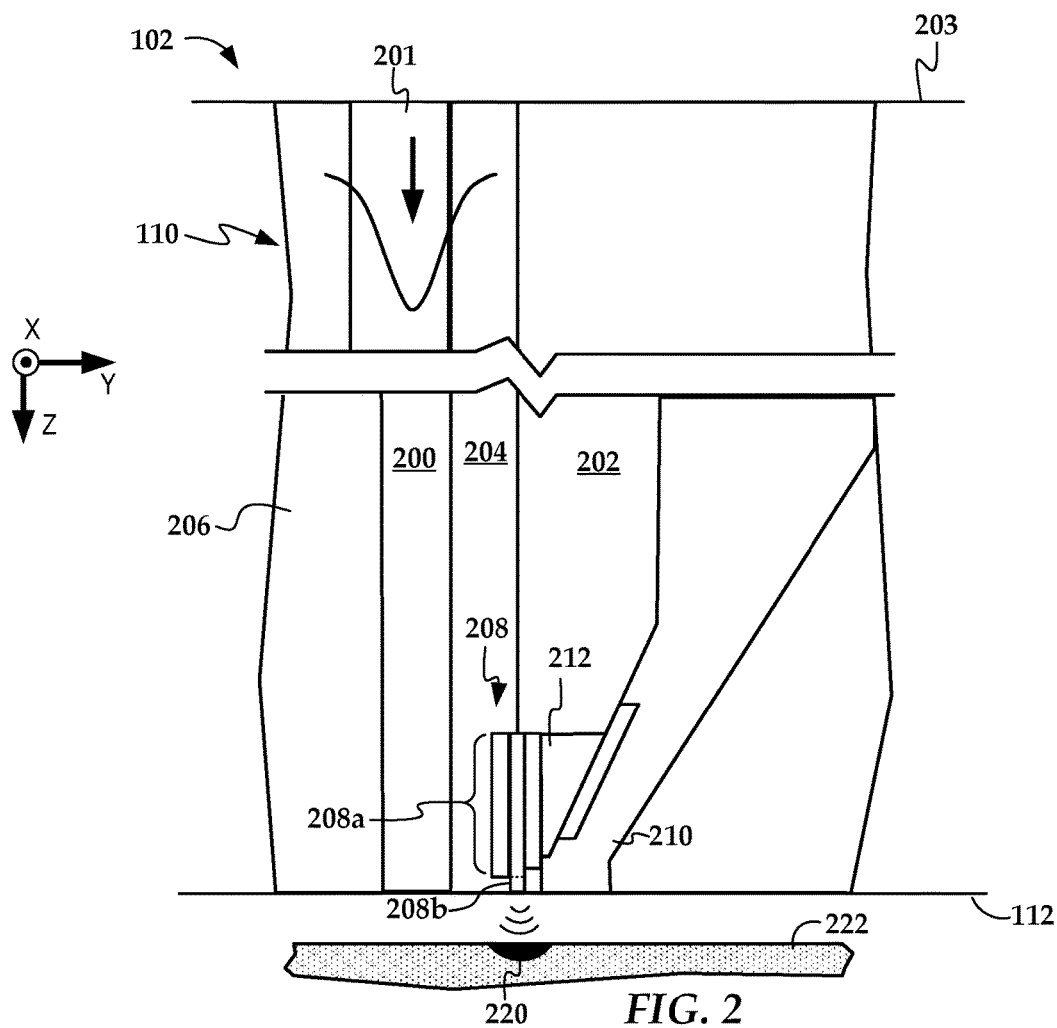
FIG. 2 is a cross-sectional view of a slider along a down-track plane according to according to an example embodiment.

In FIG. 2, a cross-sectional views show details of a slider body 102 according to an example embodiment. The waveguide 110 includes a core 200, top cladding layer 202, side cladding layer 204, and bottom cladding 206. A waveguide input coupler 201 at a top surface 203 of the slider body 102 couples light from the light source 106 to the waveguide 110. The waveguide input coupler 201 receives light from the light source 106 and transfers the light to the core 200. The waveguide core 200 is made of dielectric materials of high index of refraction. The cladding layers 202, 204, 206 are each formed of a dielectric material having a refractive index lower than the core 200.

The core 200 delivers light to an NFT 208 that is located within the side cladding layer 204 at the media-facing surface 112. A write pole 210 (which is a distal part of a magnetic write transducer) is located near the NFT 208. The magnetic write transducer may also include a yoke, magnetic coil, return pole, etc. (not shown). A heat sink 212 thermally couples the NFT 208 to the write pole 210. The magnetic coil induces a magnetic field through the write pole 210 in response to an applied current. During recording, an enlarged portion 208a (e.g., a rounded disk) of the NFT 208 achieves surface plasmon resonance in response to light delivered from the core, and the plasmons are tunneled via a peg 208b out the media-facing surface 112. The energy delivered from the NFT 208 forms a hotspot 220 within a recording layer of a moving recording medium 222. The write pole 210 sets a magnetic orientation in the hotspot 220, thereby writing data to the recording medium.

Figure 3:
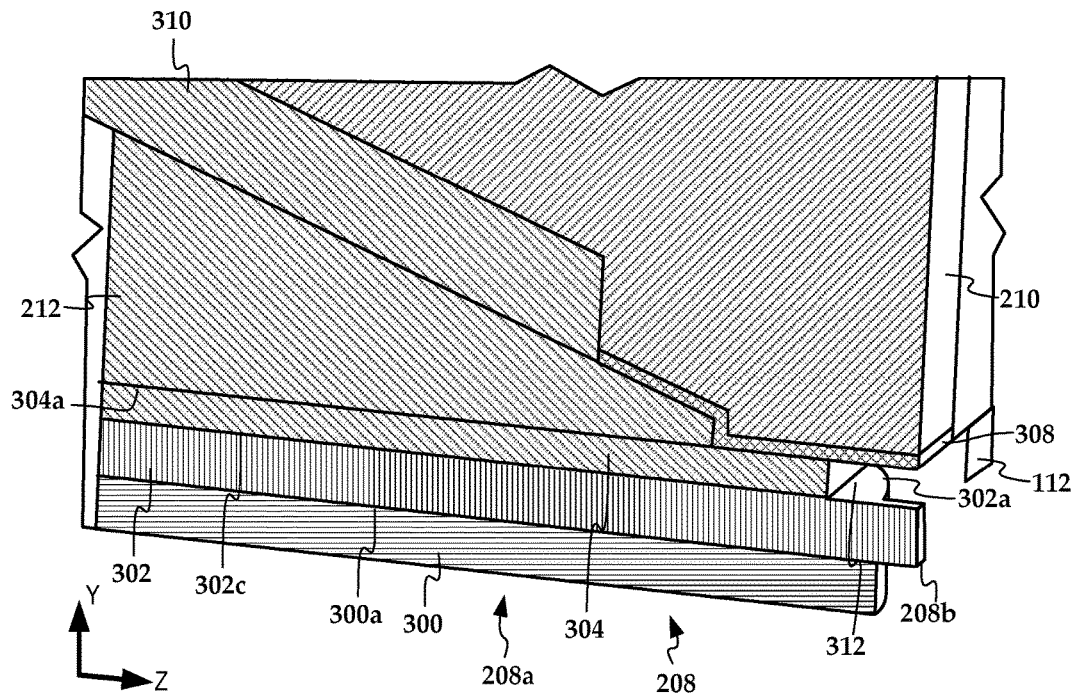
FIG. 3 is a perspective view of a near-field transducer and write pole according to an example embodiment.
Figure 4:
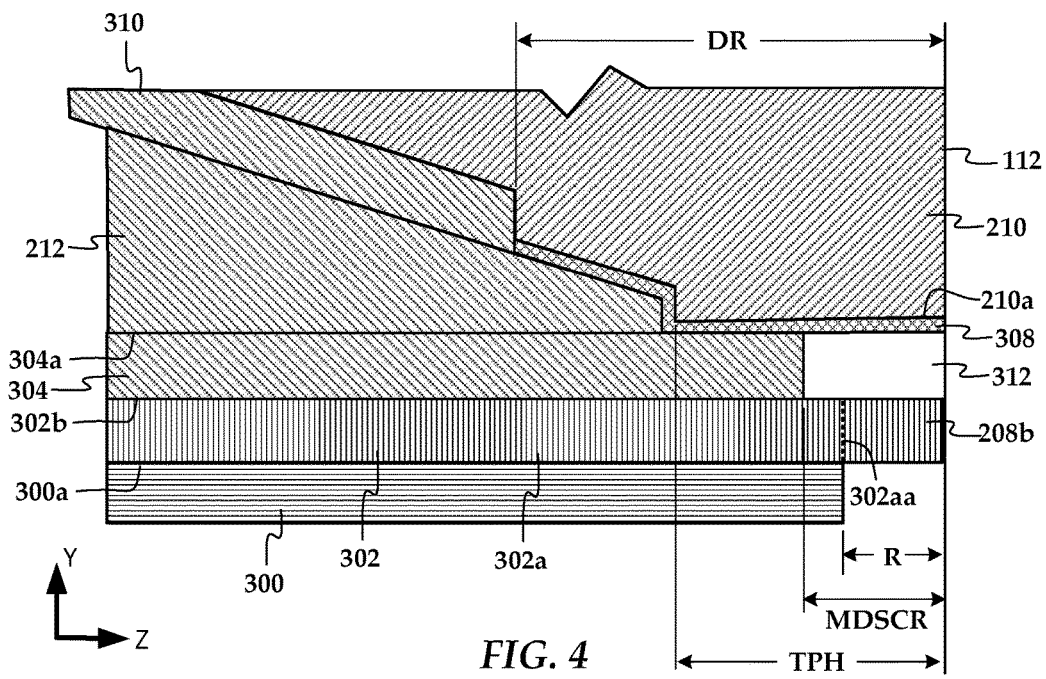
FIG. 4 is a side view of near-field transducer and write pole shown in FIG. 3.

In FIGS. 3 and 4, perspective and side cross-sectional views show details of the NFT 300 according to an example embodiment. The NFT 208 includes a bottom disc 300 formed of a first material (e.g., gold) and having a first surface 300a facing the write pole 210. The bottom disc 300 is recessed from the media-facing surface 112 by a distance R (see FIG. 4). An anchor layer 302 is stacked on the first surface 300a of the bottom disc 300 and has an enlarged part 302a with a peripheral shape corresponding to that of the bottom disc 300.

The peg 208b is part of the anchor layer 302 and extends from an end 302aa (see FIG. 4) of the enlarged part 302a of the anchor layer 302 towards the media facing surface 112. The anchor layer 302 formed of a second material (e.g., rhodium) that is more mechanically robust (although possibly less optically efficient than) the first material. The anchor layer 302 has a second surface 302b that faces the write pole 210. The end 302aa of the enlarged part 302a of the anchor layer 302 is also recessed from the media facing surface 112 by the distance R.

A middle disc 304 is stacked on the second surface 302b of the anchor layer 302. The middle disc 304 is recessed from the media-facing surface 112 a distance MDSCR (see FIG. 4) that is greater than the distance R. The middle disc has a third surface 304a that faces the write pole 210. The heat sink 212 is stacked on the third surface 304a of the middle disc. The heat sink 212 is recessed from the media-facing surface by at least a distance TPH (see FIG. 4) that is greater than the distance MDSCR. The heat sink 212 is thermally coupled to the write pole 210.

In this example, a pole coating 306 is shown located between the heat sink 212 and the write pole 210. The pole coating 306 extends towards the media-facing surface 112 such that it also separates the middle disc 304 from the write pole 210. The pole coating 308 is formed of a material (e.g., Ir) that inhibits material diffusion between the write pole 210 and the NFT 208. Because of the pole coating 308, the heat sink 212 is recessed from the media-facing surface 112 by the distance TPH plus a thickness of the pole coating 308.

The write pole 210 has a side 210a extending from the media-facing surface 112 the distance TPH. Due to this geometry, a part of the middle disc 304 partially fills in a gap 312 between the anchor layer 208b and the side of the write pole 210a. Also seen in this example is a heat diffuser 310 that is located in a recess of the write pole 210 away from the media-facing surface 112. The heat diffuser 310 helps carry heat from the heat sink 212 away from the media-facing surface 112.

Figure 5:
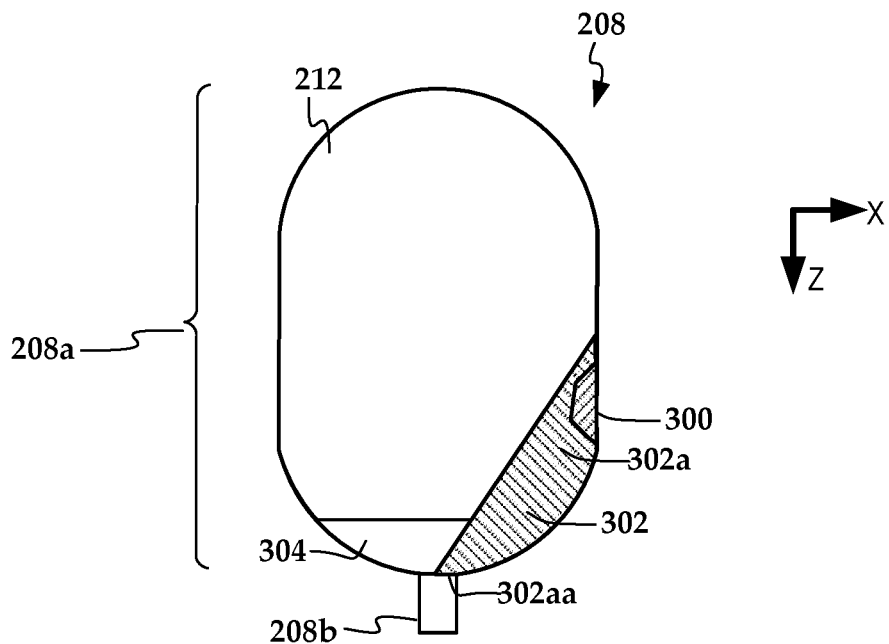
FIGS. 5 and 6 are top, cutaway, views of near-field transducers according to example embodiments.

In FIG. 5, a top cutaway view shows additional details of the NFT 208 according to an example embodiment. Generally, the middle disc 304, anchor layer 302 and bottom disc 300 collectively form the enlarged part 208a of the NFT 208. The enlarged part 208a achieves surface plasmon resonance in response to being illuminated by a waveguide and has a peripheral shape that directs the surface plasmons to the peg 208b. The enlarged part 208a is a stadium peripheral shape in this example, although other shapes may be used, including circular, rectangular, or a combination thereof (e.g., curved on one end facing the media-facing surface and flat on an end facing away from the media-facing surface). The enlarged part 302a of the anchor layer 302 in this example has a peripheral shape that corresponds to a full periphery of the bottom disc 300, such that the bottom disc 300 is completely covered by the anchor layer 302 in the substrate-parallel plane (the xz-plane).

Figure 6:
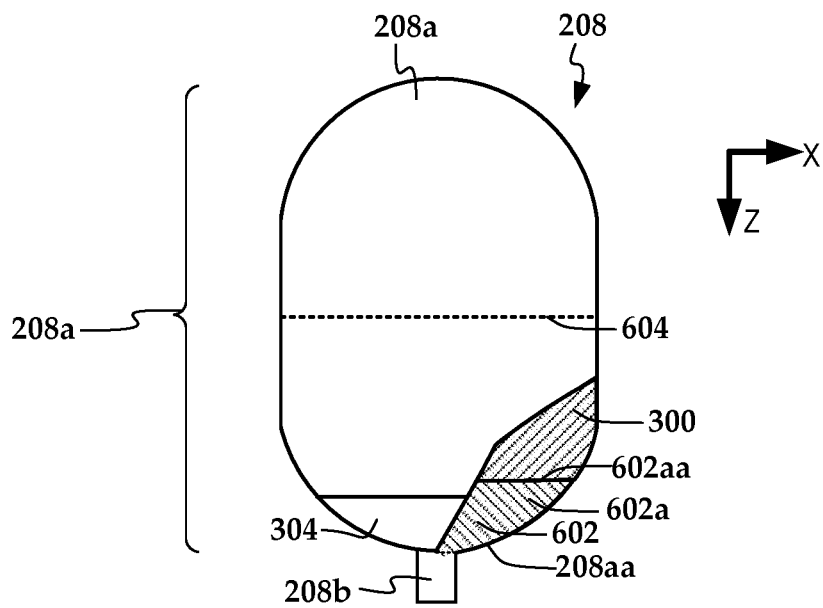
Figure 7:
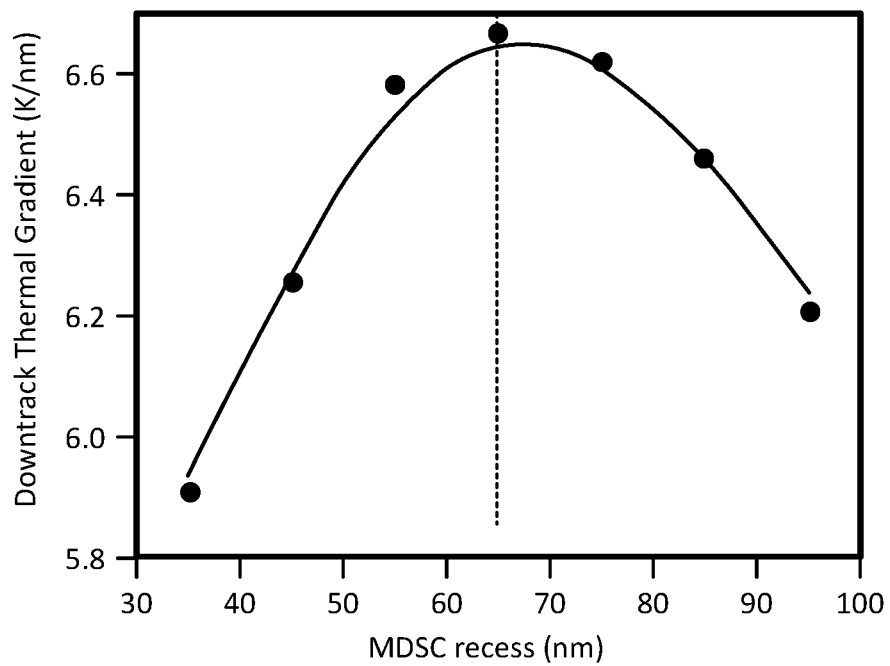
FIGS. 7-11 are graphs showing simulated performance of a near-field transducer and write pole according to example embodiments.
Figure 8:
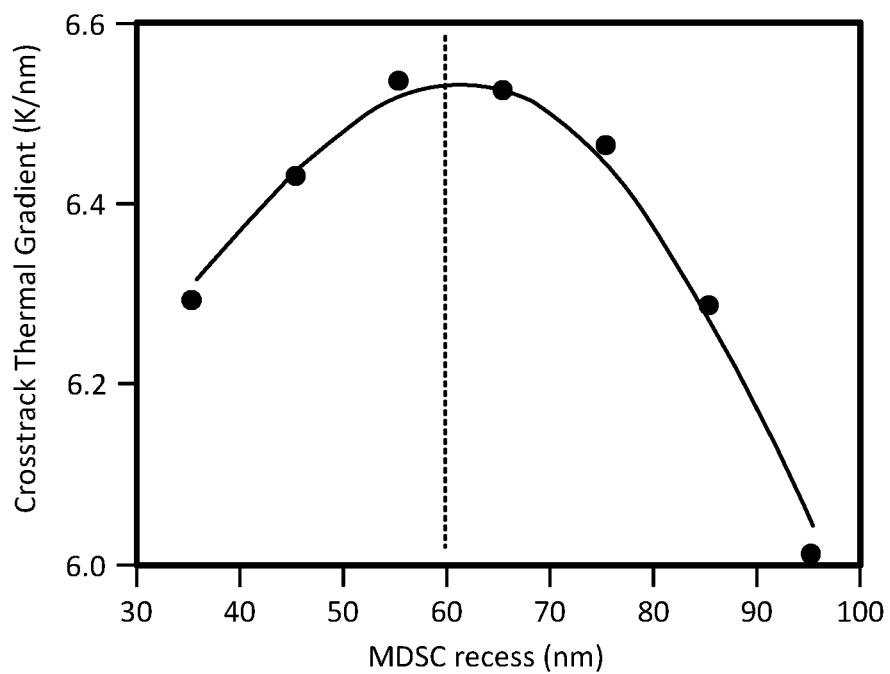
Figure 9:
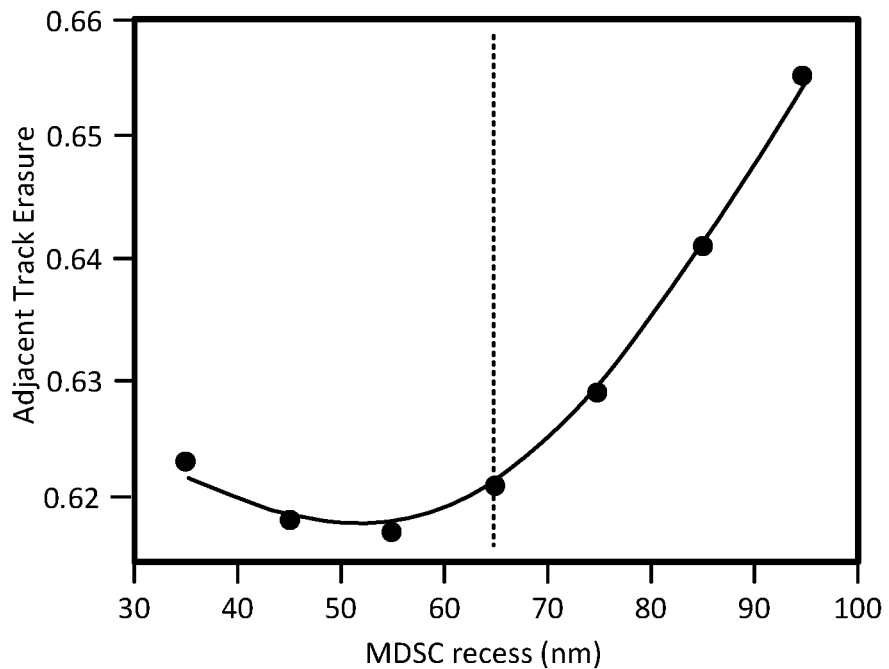
Figure 10:
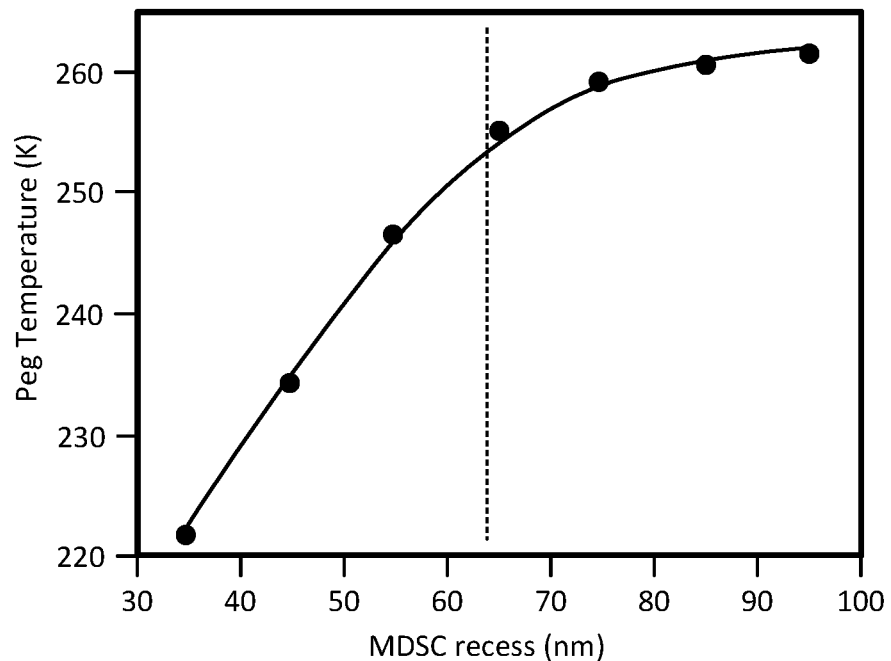
Figure 11:
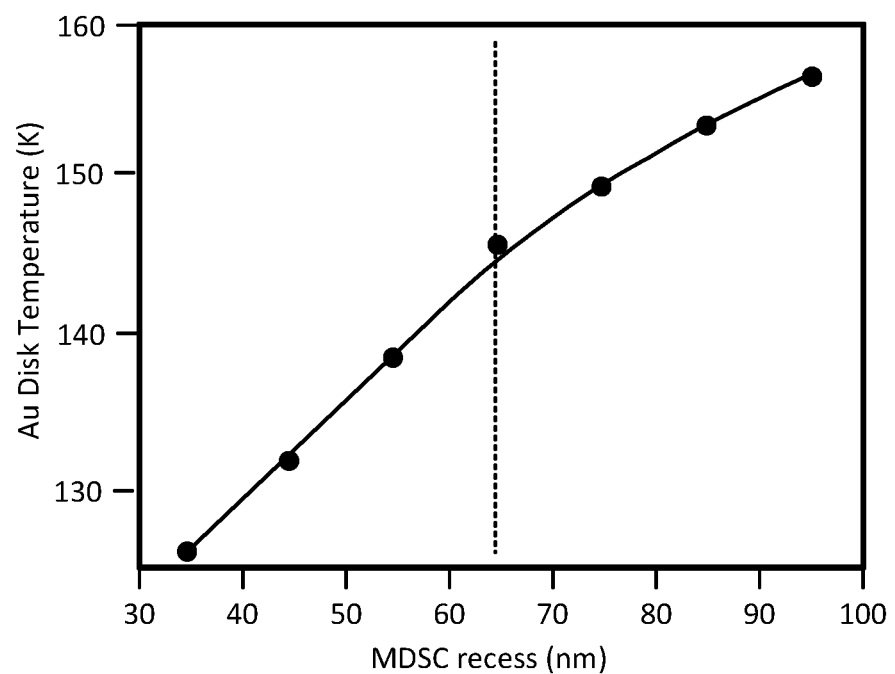

In FIG. 6, a top cutaway view shows additional details of the NFT 208 according to another example embodiment. An alternatively configured anchor layer 602 includes the peg 208b as in previously described embodiments joined with an enlarged part 602a. In this example, the alternatively configured enlarged part 602a has a peripheral shape that only partly corresponds to that of the bottom disc 300. Both the bottom edges of disc 300 and the anchor layer 602 have the same peripheral shape along a bottom edge 208aa of the enlarged part 208a of the NFT 208. A top edge 602aa of the enlarged anchor layer part 602a is flat, although may have other shapes, e.g., convex or concave curves, convex or concave piecewise linear, etc. The top edge 602aa may be located anywhere relative to the bottom disc 300, e.g., below or above middle 604 of the NFT 208.

By configuring the NFT and write pole with separate MDSC recess distances and TPH distances, the performance of the NFT and the write pole can be separately optimized. The MDSCR distance will define optical performance (thermal gradient, NFT temperature) without significantly impacting magnetic performance of the write pole. The TPH distance will define magnetic performance without significantly impacting optical performance of the NMFT. The purpose of MDSCR is to separate optics from magnetics while changing TPH. It is estimated that a 10-20% magnetic field increase can be had with a 100–200 nm long TPH. In Table 1 below, various other performance measures of a HAMR head are shown based on simulations of the NFT and pole design described herein with 65 nm MDSC. Note that the diffuser recess shown in Table 1 corresponds to the DR dimension shown in FIG. 4. The other columns in Table 1 are, in order from left to right, downtrack thermal gradient (DT-TG), crosstrack TG (CT-TG), adjacent track erasure (ATE), and delta temperature for the NFT peg, NFT enlarged part, and write pole.

TABLE 1

| TPH | Diffuser recess | DT-TG | CT-TG | ATE | Peg $\Delta T(K)$ | Au $\Delta T(K)$ | Pole $\Delta T(K)$ |
| --- | --- | --- | --- | --- | --- | --- | --- |
| 55 nm | 255 nm | 6.68 | 6.57 | 0.619 | 250 | 139 | 96.9 |
| 155 nm | 255 nm | 6.673 | 6.53 | 0.621 | 255 | 146 | 98.2 |
| 255 nm | 355 nm | 6.67 | 6.56 | 0.620 | 264 | 156 | 102 |
| 355 nm | 455 nm | 6.66 | 6.53 | 0.620 | 276 | 167 | 110 |

This analysis shows small changes in thermal gradient with relatively large values of TPH. The NFT and write pole temperatures increase 5-10K with relatively large values of TPH. In FIGS. 7-11, graphs show the simulation results for different values of MSCDR, with TPH=155 nm. Generally, a value of MSCDR=65 nm is optimal for the values used in this simulation.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A near field transducer, comprising:
a bottom disc formed of a first material and having a first surface facing a write pole of a recording head, the bottom disc recessed from a media-facing surface of the recording head by a distance R;
an anchor layer stacked on the first surface of the bottom disc and having an enlarged part with a peripheral shape corresponding to that of the bottom disc, the anchor layer further comprising a peg that extends from an end of the enlarged part towards the media facing surface, the anchor layer formed of a second material that is more mechanically robust and less optically efficient than the first material, the anchor layer having a second surface that faces the write pole, the end of the enlarged part recessed from the media facing surface by the distance R;
a middle disc on the second surface of the anchor layer, the middle disc recessed from the media-facing surface a distance MDSCR that is greater than the distance R, the middle disc having a third surface that faces the write pole; and
a heat sink stacked on the third surface of the middle disc, the heat sink recessed from the media-facing surface by at least a distance TPH that is greater than the distance MDSCR, the heat sink thermally coupled to the write pole.

2. The near-field transducer of claim 1, wherein the middle disk and the heat sink are formed of the first material.

3. The near-field transducer of claim 2, wherein the first material comprises gold.

4. The near-field transducer of claim 1, wherein the second material comprises rhodium.

5. The near-field transducer of claim 1, wherein the write pole has a side extending from the media-facing surface the distance TPH, such that a part of the middle disc partially fills in a gap between the anchor layer and the side of the write pole.

6. The near-field transducer of claim 1, wherein the peripheral shape of the enlarged part of the anchor layer corresponds to a full periphery of the bottom disc.

7. The near-field transducer of claim 1, wherein the peripheral shape of the enlarged part of the anchor layer corresponds to only a bottom part of the bottom disc, the bottom part facing the media-facing surface.

8. The near-field transducer of claim 1, wherein the bottom disc, the anchor layer, and the middle disc collectively form an enlarged part of the near-field transducer that achieves surface plasmon resonance in response to being illuminated via a waveguide and directs the surface plasmons to the peg.

9. The near-field transducer of claim 1, wherein the distance MDSCR can be adjusted to optimize optical performance of the near-field transducer without significantly impacting performance of the write pole.

10. A recording head, comprising:
a write pole extending to a media facing surface;
a bottom disc formed of a first material and having a first surface facing the write pole, the bottom disc recessed from the media-facing surface by a distance R;
an anchor layer stacked on the first surface of the bottom disc and having an enlarged part with a peripheral shape corresponding to that of the bottom disc, the anchor layer further comprising a peg that extends from an end of the enlarged part towards the media facing surface, the anchor layer formed of a second material that is more mechanically robust and less optically efficient than the first material, the anchor layer having a second surface that faces the write pole, the end of the enlarged part recessed from the media facing surface by the distance R;
a middle disc on the second surface of the anchor layer, the middle disc recessed from the media-facing surface a distance MDSCR that is greater than the distance R, the middle disc having a third surface that faces the write pole; and
a heat sink stacked on the third surface of the middle disc, the heat sink recessed from the media-facing surface by at least a distance TPH that is greater than the distance MDSCR, the heat sink thermally coupled to the write pole.

11. The recording head of claim 10, wherein the middle disk and the heat sink are formed of the first material.

12. The recording head of claim 11, wherein the first material comprises gold.

13. The recording head of claim 10, wherein the second material comprises rhodium.

14. The recording head of claim 10, wherein the write pole has a side extending from the media-facing surface the distance TPH, such that a part of the middle disc partially fills in a gap between the anchor layer and the side of the write pole.

15. The recording head of claim 10, wherein the peripheral shape of the enlarged part of the anchor layer corresponds to a full periphery of the bottom disc.

16. The recording head of claim 10, wherein the bottom disc, the anchor layer, and the middle disc collectively form an enlarged part of a near-field transducer that achieves surface plasmon resonance in response to being illuminated via a waveguide and directs the surface plasmons to the peg.

17. The recording head of claim 10, wherein the distance MDSCR can be adjusted to optimize optical performance of the near-field transducer without significantly impacting performance of the write pole.

18. The recording head of claim 10, wherein the distance TPH can be adjusted to optimize performance of the write pole without significantly impacting optical performance of a near-field transducer that collectively comprises the bottom disc, the anchor layer, and the middle disc.

19. A near field transducer, comprising:
- a bottom disc formed of gold and having a first surface facing a write pole of a recording head, the bottom disc recessed from a media-facing surface of the recording head by a distance R;
- an anchor layer stacked on the first surface of the bottom disc and having an enlarged part with a peripheral shape at least partially corresponding to that of the bottom disc, the anchor layer further comprising a peg that extends from an end of the enlarged part towards the media facing surface, the anchor layer formed of a second material that is more mechanically robust than gold, the anchor layer having a second surface that faces the write pole, the end of the enlarged part recessed from the media facing surface by the distance R;
- a gold middle disc on the second surface of the anchor layer, the gold middle disc recessed from the media-facing surface a distance MDSCR that is greater than the distance R, the gold middle disc having a third surface that faces the write pole; and
- a gold heat sink stacked on the third surface of the middle disc, the gold heat sink recessed from the media-facing surface by at least a distance TPH that is greater than the distance MDSCR, the heat sink thermally coupled to the write pole, wherein the distances MDSCR and TPH can be independently adjusted to independently optimize optical performance of the near-field transducer and the write pole.

20. The near-field transducer of claim 19, wherein the write pole has a side extending from the media-facing surface the distance TPH, such that a part of the middle disc partially fills in a gap between the anchor layer and the side of the write pole.

* * * * *